(12) United States Patent
Levin et al.

(10) Patent No.: US 10,261,880 B1
(45) Date of Patent: Apr. 16, 2019

(54) ERROR GENERATION USING A COMPUTER ADD-IN CARD

(71) Applicant: Amazon Technologies, Inc., Seattle, WA (US)

(72) Inventors: Alex Levin, Cupertino, CA (US); Ron Diamant, Albany, CA (US); Christopher James BeSerra, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/384,026

(22) Filed: Dec. 19, 2016

(51) Int. Cl.
  *G06F 11/00* (2006.01)
  *G06F 11/30* (2006.01)
  *G06F 11/22* (2006.01)

(52) U.S. Cl.
  CPC ........ *G06F 11/3027* (2013.01); *G06F 11/221* (2013.01); *G06F 11/2221* (2013.01); *G06F 11/2289* (2013.01); *G06F 11/3037* (2013.01); *G06F 11/3051* (2013.01)

(58) Field of Classification Search
  CPC ............... G06F 11/3027; G06F 11/221; G06F 11/2221; G06F 11/2289; G06F 11/3037; G06F 11/3051
  See application file for complete search history.

(56) References Cited

U.S. PATENT DOCUMENTS

| | | | | |
|---|---|---|---|---|
| 4,835,459 A | * | 5/1989 | Hamlin | G06F 11/22 324/73.1 |
| 6,519,718 B1 | * | 2/2003 | Graham | G06F 11/221 714/32 |
| 6,704,894 B1 | * | 3/2004 | Kania | G01R 31/31835 714/25 |
| 7,962,808 B2 | * | 6/2011 | Li | G06F 11/2733 370/224 |
| 2005/0235187 A1 | * | 10/2005 | Lai | G01R 1/31716 714/733 |

* cited by examiner

*Primary Examiner* — Jason B Bryan
(74) *Attorney, Agent, or Firm* — Klarquist Sparkman, LLP

(57) ABSTRACT

A smart add-in card can be leveraged to perform testing on a host server computer. The add-in card can include an embedded processor and memory. Tests can be downloaded to the add-in card to test a communication bus between the host server computer (motherboard) and the add-in card. In a particular example, a PCIe communication bus couples the motherboard to the add-in card and the tests can inject errors on the PCIe communication bus. The tests can be developed to test errors that are typically difficult to test without the use of special hardware. However, the smart add-in card can be a simple Network Interface Card (NIC) that resides on the host server computer during normal operation and is used for communication other than error testing. By using the NIC as a testing device, repeatable and reliable testing can be obtained.

20 Claims, 8 Drawing Sheets

ERROR GENERATION USING A COMPUTER ADD-IN CARD

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing can include a plurality of server computers interconnected within a data center. The server computers typically include expansion boards (also called expansion cards) which can be inserted into expansion slots on the server computers to add functionality to the computer system. A server computer communicates with the expansion cards through an expansion bus which electrically connects the internal hardware of the computer with peripheral devices. One type of expansion card includes a network interface card (NIC) which typically provides the server computer with a dedicated, full-time connection to a network.

One type of expansion bus is a Peripheral Component Interconnect Express (PCIe) bus which is a high-speed serial computer expansion bus standard. Other bus types can also be used in place of the PCIe bus, such as the ASUS media bus, the multi-bus, SBUS, etc. Expansion cards that include a CPU and/or DRAM are considered to be "smart" cards. The smart expansion cards can be programmed to run various software applications that enable the card to provide increased flexibility over typical hardware-only interface cards.

The expansion cards can have various types of error reporting. For example, PCIe uses the advanced error reporting (AER) to report errors to the host server computer. Example errors can include a link error, a parity error, etc. Testing of errors can be problematic and there are a variety of errors that rarely occur, which are even more difficult to detect.

The expansion cards can also represent a vulnerability for attacks from malicious software. For example, malicious software can inject errors into the server bus in order to create problems on the host server computer. Thus, it is desirable to perform testing on any expansion card to prevent attacks on the server computer via malicious software injected through the expansion card. Additionally, updates of the server computer, such as updates of the operating system or BIOS, can expose the host server computer to new malicious attacks via the expansion card.

DETAILED DESCRIPTION

A "smart add-in card" (for example, a smart Network Interface Card (NIC)) is an add-in card that has an embedded CPU and memory (e.g., DRAM), and can be programmed to execute various software applications. Host tools can allow control of the smart add-in card from the host server computer. For example, in the case where a communication bus is PCIe, the host server computer can act as the PCIe Root Complex. The host tools can be used to communicate with the smart add-in card over PCIe using the Base Address Registers (BARs) to transfer data so as to make the smart card perform various operations. Using these host tools, binaries can be sent to the smart card to execute specific software testing operations. For example, the binaries can be such that the smart add-in card is used as a testing device for deliberately triggering hard-to-reach errors. More specifically, in the PCIe specification there is a clause discussing Advanced Error Reporting (AER), which among others includes errors such as receiver errors, Transaction layer Packet (TLP) errors, parity errors, correctable and uncorrectable errors, etc. Such errors can be triggered in a controlled environment to make sure the PCIe root port (named "the host server computer" or root complex), deals with the errors in a desired manner. For example, a customer instance running on a server computer should not be affected by such errors in any way. The technology described herein provides the ability to check how the host server computer handles multiple error events so that it has the ability to protect itself from a physical access of an attacker over a PCIe communication bus and from any failure that could harm the server or its associated software. As discussed herein, the host server computer refers to a motherboard operating as the main computational engine of the computer. Add-in cards, while being physically in the same chassis as the motherboard, in at least some cases operate as an independent logical computer.

Figure 1:
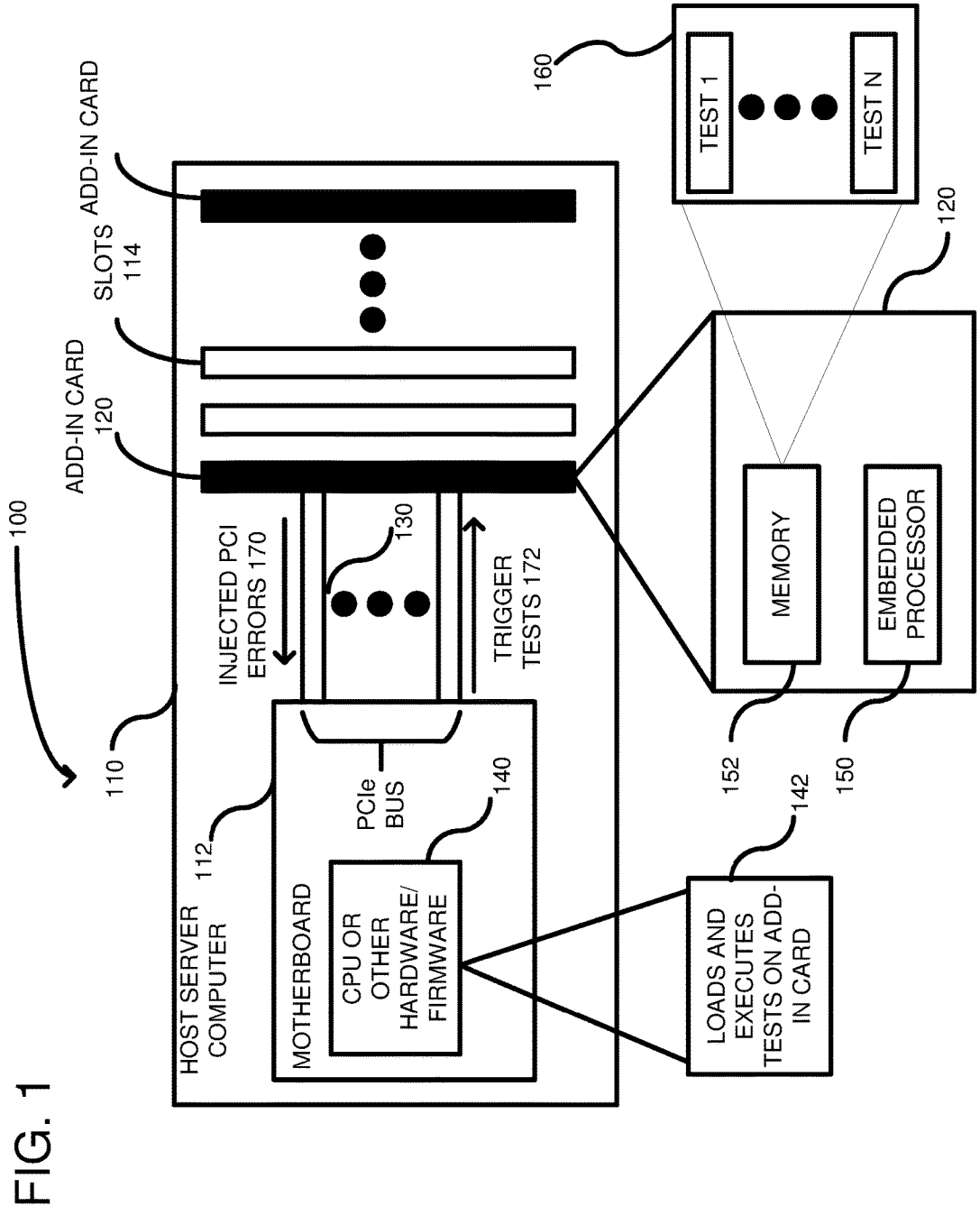
FIG. 1 is an example system diagram showing a host server computer including one or more add-in cards for injecting errors on a communication bus.

FIG. 1 shows a system 100 including a host server computer 110. The host server computer includes a motherboard 112 and multiple slots 114 for receiving one or more add-in cards 120. The motherboard 112 is coupled to the add-in cards 120 via a communication bus 130, such as PCIe bus or other type of communication bus. The motherboard 112 includes a CPU 140 or other hardware/firmware for executing commands (e.g., in software) to the add-in cards 120 via the communication bus 130. Example commands include commands to load and execute tests on the add-in card, such as is shown at 142. The add-in card 120 is considered a "smart card" due to an embedded processor 150 and a memory 152. The memory 152 can be used for storing a plurality of tests 160, such as test 1 through test N. Such tests can be used for injecting errors onto the communication bus 130, such as PCIe errors, shown at 170. The tests 160 can be triggered from the commands 142 as indicated at 172. In this way, the motherboard 112 can execute one or more tests on the add-in cards so as to test the communication bus 130 on the host server computer 110.

The PCIe errors that can be used include transaction layer errors, data link layer errors, physical layer errors, etc. PCIe is a packet-based serial bus that provides a high-speed point-to-point differential signaling link for interconnecting devices. At the transaction layer, checks can be performed, such as an ECRC check failure, errors in packet formats, time outs, unsupported requests, data corruption, etc. The data link layer errors can include one or more of the following: LCRC check failure for TLPs, sequence number checks for TLPs, LCRC check failure, data link layer protocol errors, etc. Physical layer errors can include receiver errors and link errors. Any desired errors can be used and included in the tests 160. Other examples include payload exceeding maximum size, data length does not correspond to header, ECRC error, unsupported requests errors, etc.

When using the PCIe protocol, the host server computer operates as a PCIe root complex and the add-in card acts as a PCIe endpoint. If other protocols are used, then the host server computer and add-in card assume the corresponding roles under that protocol.

In sum, an add-in card used in normal operation of the host server computer can be leveraged for in-depth PCIe communication bus testing. The add-in card can be a NIC for allowing communication between the host server computer 110 and other network devices. Other add-in cards can be used, but such add-in cards should include an embedded processor or other hardware that can execute a software agent, and memory. Example add-in cards include the following: cryptographic smart cards, SATA smart cards, etc.

Figure 2:
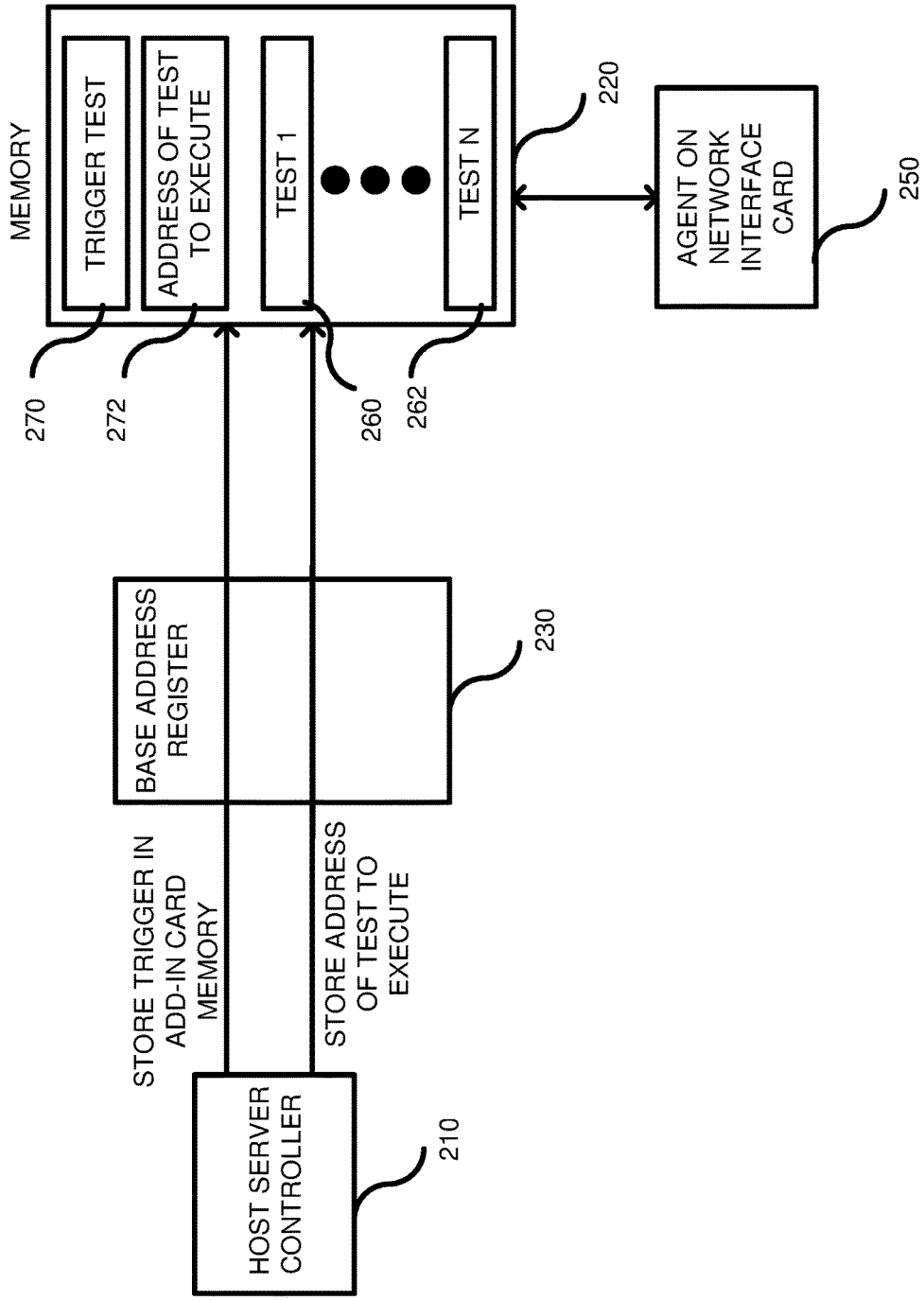
FIG. 2 shows the host server computer communicating with the add-in card through a Base Address Register (BAR).

FIG. 2 is an example configuration wherein a host server controller 210 communicates with a memory 220 of an add-in card through a Base Address Register 230 (BAR). The host server controller 210 can be a processor or other firmware on a motherboard of a host server computer. The BAR 230 can be used to map addresses from the host server controller 210 to the memory 220 on the add-in card through an address translation. The add-in card can include a software agent 250, which executes on a processor (not shown) located on the add-in card. The host server controller 210 can load a plurality of tests 1-N, such as is shown at 260, 262 (where N is any number). A memory location shown at 270 can be used as a flag to indicate to the agent 250 whether or not to begin performance of the tests. Thus, the agent 250 can loop on the flag 270 until the flag is set. Once the flag is set, the agent can read register 272 in order to obtain an address of the test which is to be executed. The agent can then load and execute the appropriate test in order to test PCIe functionality. For example, the agent 250 can inject PCIe errors on to the communication bus so as to determine how the host server computer responds to the errors. Although a memory structure is shown having a trigger flag 270 and a test address register 272, other configurations can be used. For example, the trigger flag 270 and the register 272 can be combined into a single register, which when loaded with an address automatically indicates that the test is triggered. The agent 250 includes the capability to control the communication bus between the add-in card and the host server computer such that it can create transactions according to the protocol associated with the communication bus. Where the communication bus is a PCIe bus, the errors can be associated with the PCIe protocol, such as outlined above.

Figure 3:
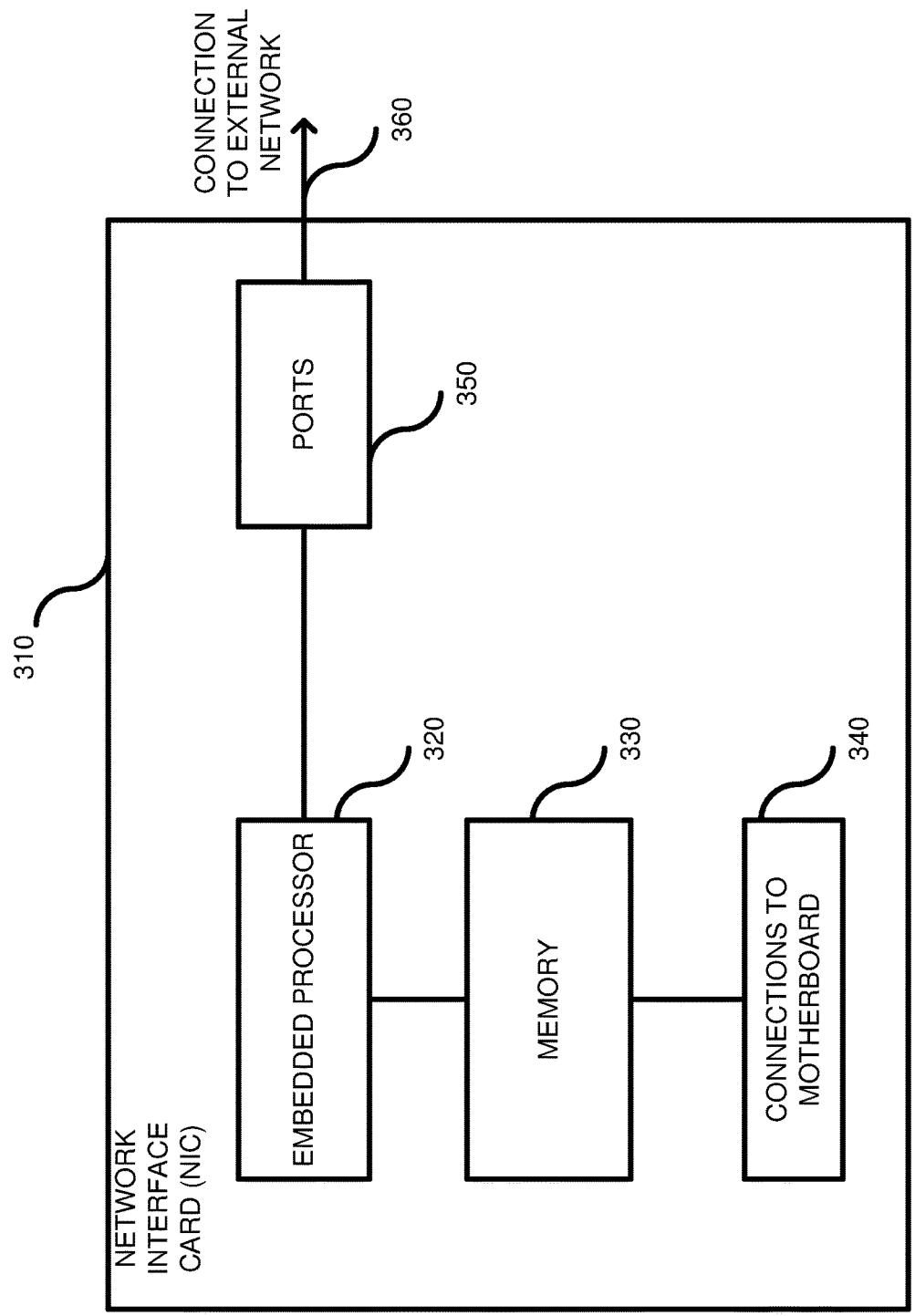
FIG. 3 shows an example add-in card, which in this case is a NIC.

FIG. 3 is an example of a NIC 310 that includes an embedded processor 320, a memory 330, connections to the motherboard 340, and I/O ports 350 for connecting to an external network 360. The embedded processor 320 can be a micro-controller, a processor or other hardware/firmware used for implementing processor-like functionality. The memory 330 can be a DRAM or other types of memory capable of having the tests stored and readable by the embedded processor 320. The connections to the motherboard 340 can be through a standard slot-type receptacle that are readily available in server computers. Example bus connections include, but are not limited to, PCIe, traditional PCI, Accelerated Graphics Port (AGP), Industry Standard Architecture (ISA), Micro Channel Architecture (MCA), etc. The ports 350 can include any variety of network connections such as Ethernet, LAN, etc. The NIC can serve dual functionality: in normal-operating mode, it can allow the host server computer to communicate over an external network; and in a test mode, it can use its processor and memory to receive and execute tests from the host server computer to test the protocol being used over the connections 340 to the motherboard.

Figure 4:
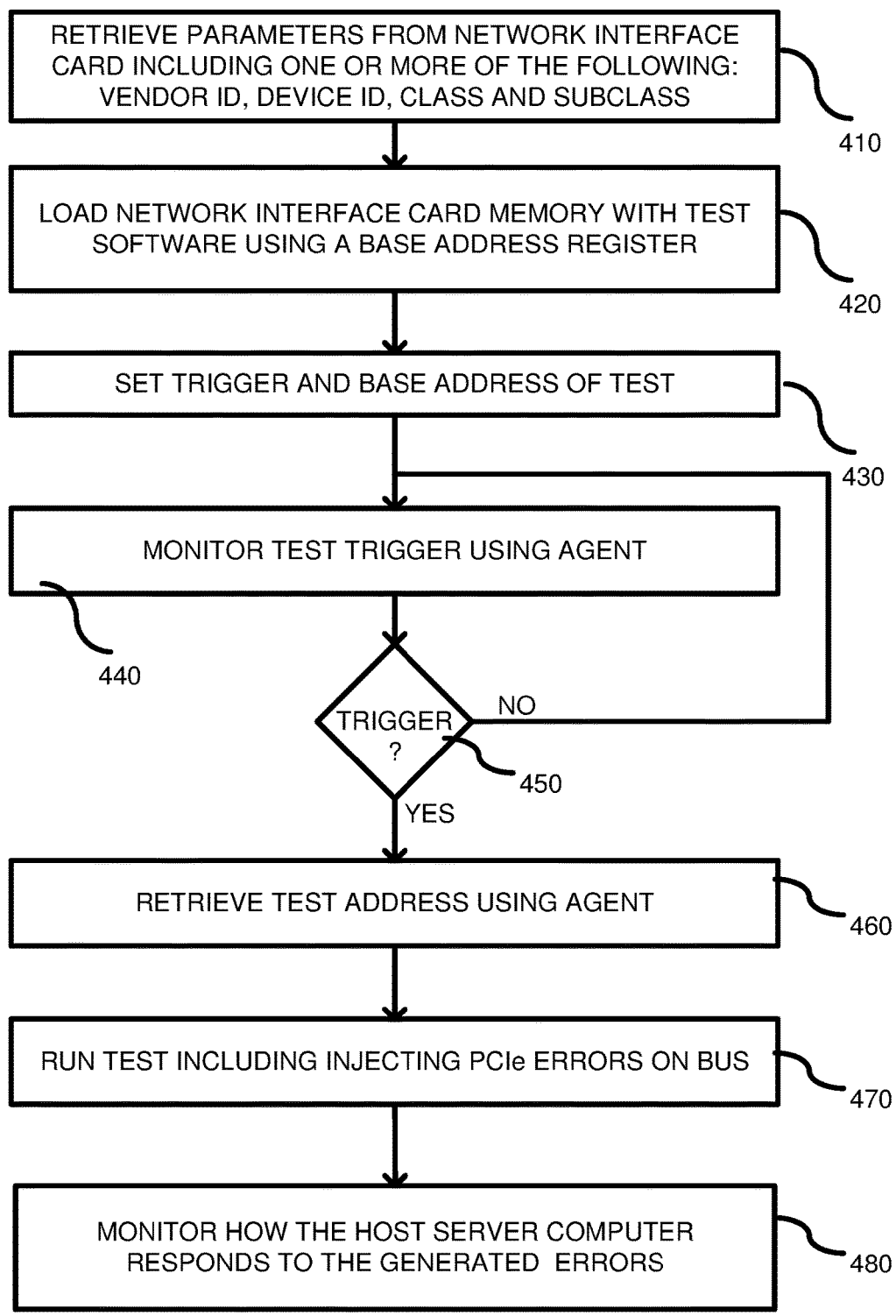
FIG. 4 is a flowchart according to one embodiment for loading tests into the add-in card and for injecting PCIe errors on a communication bus.

FIG. 4 is a flowchart according to one embodiment for injecting errors in a communication path. In process block 410, parameters can be retrieved from a NIC including one or more of the following parameters: vendor ID, device ID, class and subclass. Retrieving of these parameters can be through a PCIe request from the host server computer to the NIC. The parameters can be stored on the NIC and can change based on which interface card is installed within a slot on the host server computer. For example, different vendors provide different NICs that require different software drivers for proper functionality. The above-identified parameters can be used by the host server computer to identify the NIC and to determine which device driver to load and test. For example, the host server computer can perform a simple table lookup using the retrieved parameters. Thus, the host server computer can identify the configuration space of the add-in card through communication between the add-in card and the host server computer. In process block 420, the host server computer can load the NIC memory with test software using a Base Address Register (BAR). The test software can be any desired software tests for testing the communication bus between the host server computer's motherboard and the add-in card. The test software can be contingent based on which configuration space was detected. In process block 430, once the tests have been loaded, the host server computer can set a trigger flag and a base address where the test is located. In process block 440, the agent executing on the NIC can read the trigger flag and determine that a test is ready to be executed. The agent can then obtain the base address of the test and jump to that address so as to begin execution of the test. In decision block 450, if the trigger flag is not yet set, then the agent loops on monitoring the trigger flag. However, if the trigger flag is set, then in process block 460 the agent retrieves the test address from memory and runs the test including injecting PCIe errors on the bus (470). Finally in process block 480, the host server computer can be monitored to see how it responds to the generated errors created by the tests. Thus, difficult to test errors can be effectively tested through the use of tests loaded onto standard hardware within the host server computer. Consequently, special test hardware does not need to be separately installed on the host server computer. Instead, the host server computer can execute tests in a test mode and then switch to a normal operating mode without the need to plug or unplug testing hardware into the host server computer environment. This provides flexibility for testing to occur anytime and controlled from a remote location.

Figure 5:
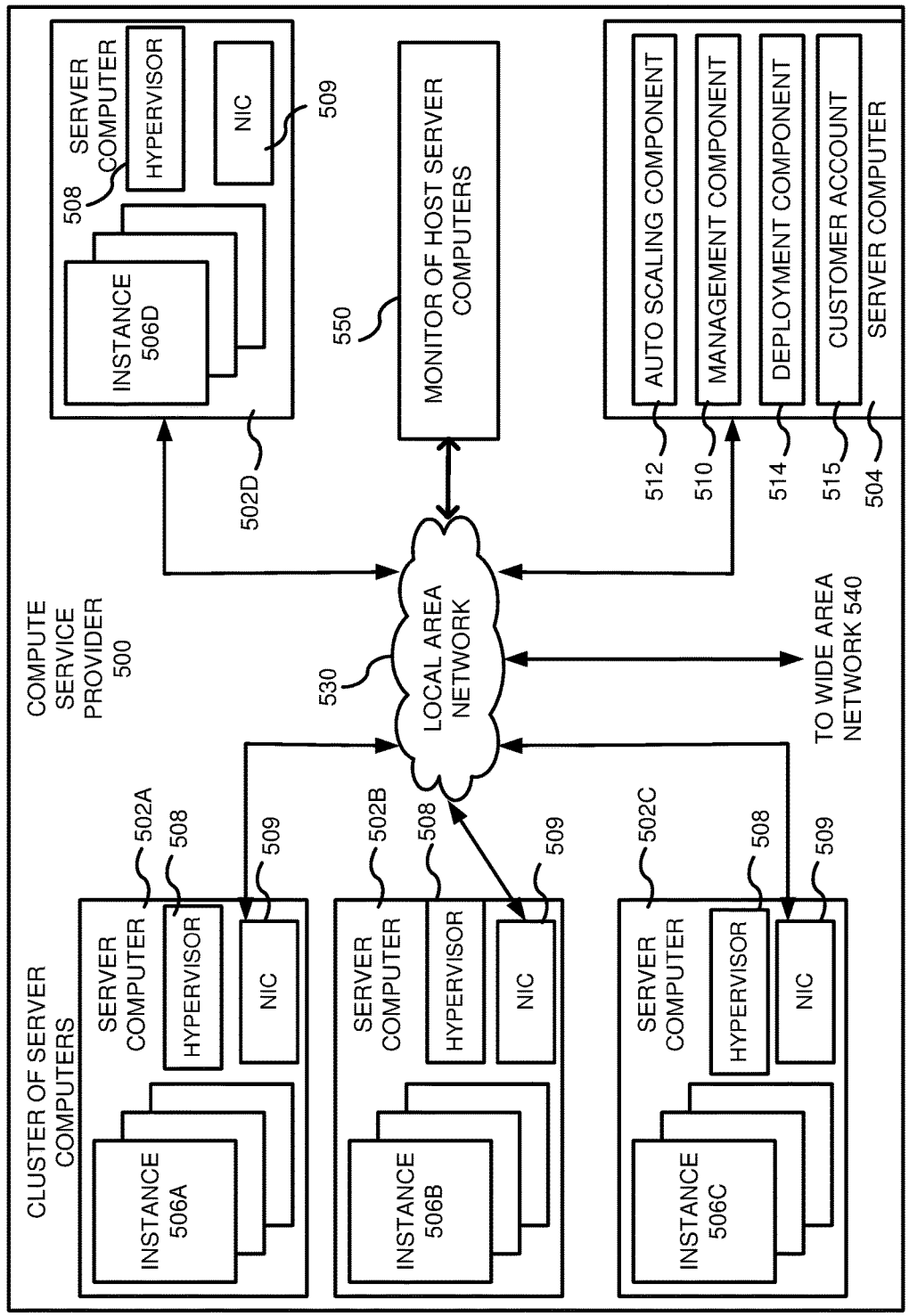
FIG. 5 is an example system diagram showing a plurality of virtual machine instances running in a multi-tenant environment with a host server computer monitoring for injected errors.

FIG. 5 is a computing system diagram of a network-based compute service provider 500 that illustrates one environment in which embodiments described herein can be used. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications. The hypervisor 508 and/or instances 506 communicate with a network 530 via a NIC 509. The NIC provides for two-way communication between the host servers 502 and the compute service provider 500.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

The network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

Each server computer 502 can be responsible for executing local tests by using the NICs 509. The results of the tests can be monitored by a server computer 550 used to monitor how the host server computers 502 respond to the injection of errors on the local bus using the NIC. Such testing can be performed at any desired point of time, but typically is executed after upgrades, such as an upgrade of an operating system or an upgrade of a BIOS.

Figure 6:
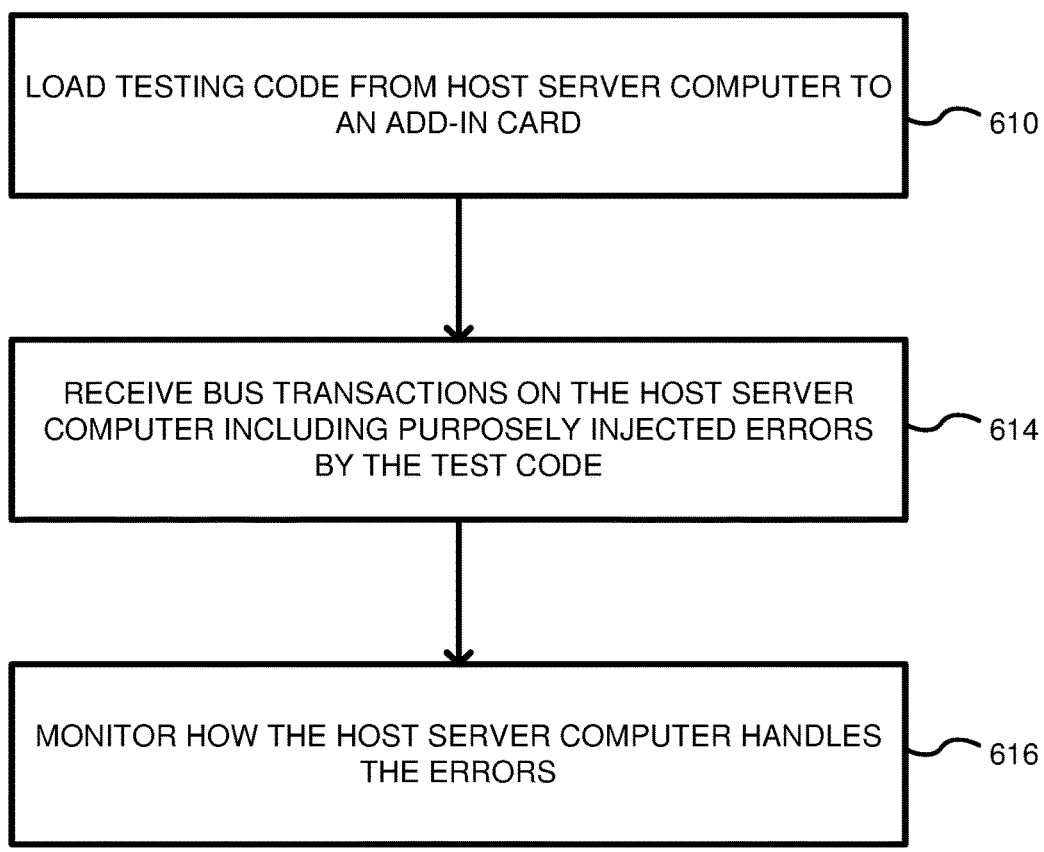
FIG. 6 is an example flowchart according to one embodiment for testing a communication bus in a host server computer.

FIG. 6 is a flowchart according to one embodiment for generating error testing for an add-in card positioned within a host server computer. In process block 610, testing code from the host server computer is loaded to the add-in card. To determine which testing code is to be loaded, the host server computer can read configuration parameters from the add-in card to determine the card type (e.g., vendor, part number, etc.) and/or configuration space. Once the add-in card is identified, the host server computer can identify the appropriate device driver supporting the add-in card. The identified device driver can be loaded onto the add-in card as well as test code used for testing the communication bus supported by the device driver. The loading of the testing code is performed by transmitting the testing code from the host server computer (e.g., processor on the motherboard) to the add-in card. The loading of the test code can occur at any time, however, such loading typically occurs after updates of an operating system or of the BIOS of the host server computer. The loading and the triggering of the test code can be managed from an external host server computer, such as host server computer 550 (FIG. 5). The add-in card can begin to execute the test code by receiving a trigger from the host server computer. For example, the trigger can be the host computer setting a flag in a memory location of the add-in card. Alternative triggers can be used such as adding a new command to the protocol passed between the host server computer and the add-in card. An example protocol for communication between the host server computer and the add-in card can be based on the PCIe standard. In process block 614 transactions are received by the host server computer including purposefully injected errors on the bus by the test code executing on the add-in card. For example, the add-in card includes an embedded processor that executes the test code in response to the trigger event from the host server computer. The test code can include software for injecting errors on the interface bus between a host server computer and the add-in card. In process block 616, monitoring is performed of how the host server computer handles errors. Such monitoring can occur from an external host server computer (e.g., server 550 from FIG. 5) that extracts log data from the host server computer upon which tests are being performed. The external host server computer can determine based on the log data that the updates to the operating system or the BIOS are operating correctly or incorrectly. If the updates pass the error testing code, then the host server computer can seamlessly switch over to an operating mode from the test mode without inserting or removing any test hardware. Thus, by using a NIC with an embedded processor, testing can be performed using the NIC and then the NIC can be switched to its normal operating mode. The NIC therefore operates as a PCIe tester and a network interface.

Figure 7:
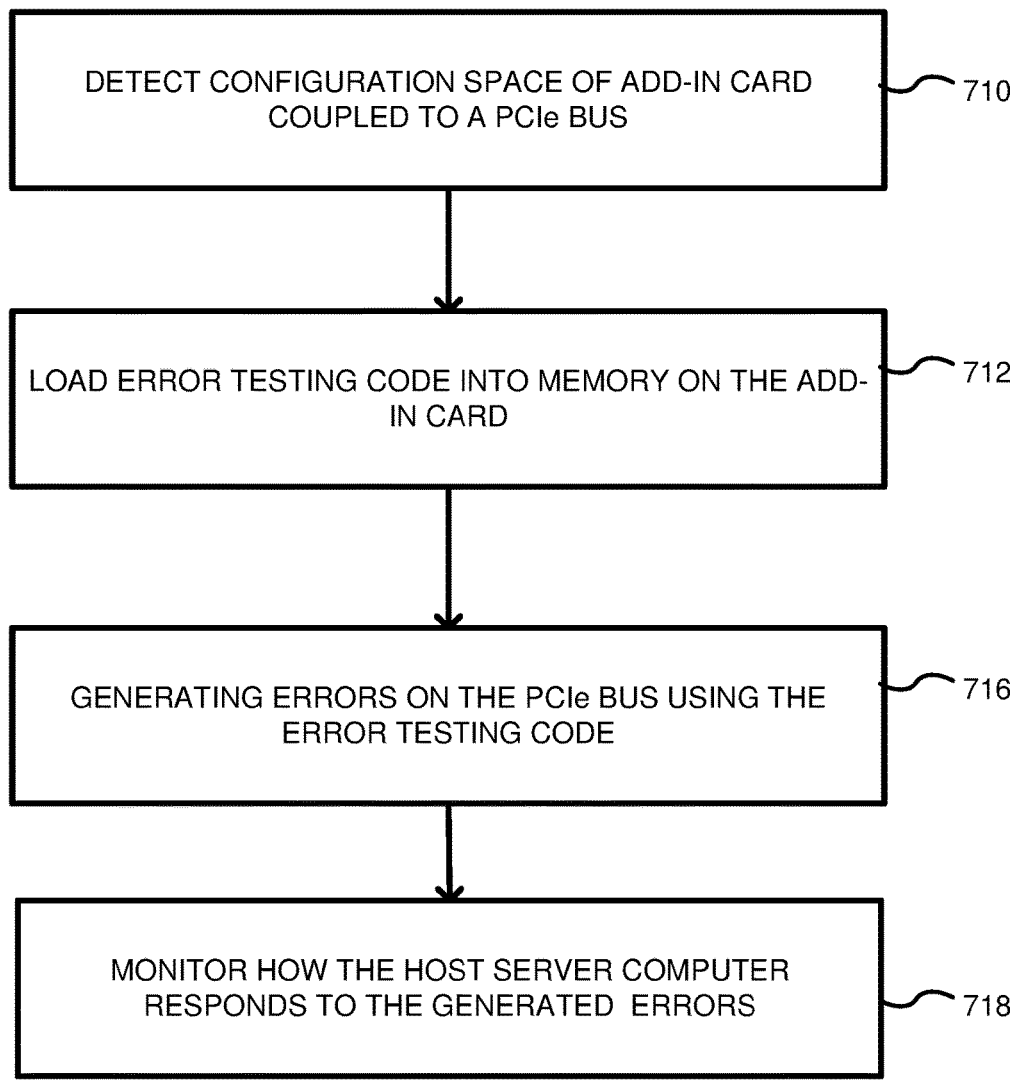
FIG. 7 is another example flowchart according to an embodiment for testing a communication bus in a host server computer.

FIG. 7 is a flowchart of a method according to another embodiment for error testing. In process block 710, configuration space of an add-in card is detected, wherein the add-in card is coupled to a PCIe bus. The configuration space can be determined by reading from the host server computer configuration parameters associated with the add-in card. The configuration parameters can be used by the host server computer to perform a lookup in a table using the configuration parameters as keys. Once the configuration space is determined, the host server computer can decide which device driver to load on the add-in card and which associated tests to load. In process block 712, error testing code can be loaded into the memory on the add-in card that was identified using the configuration parameters. The error testing code can include a plurality of different tests which are individually selectable. In process block 716, errors can be generated on the PCIe bus through use of the error testing code and the downloaded device driver. A wide variety of errors can be initiated so as to test how the host server computer responds to such errors. In process block 718, the host server computer can be monitored to determine how it responds and whether such a response indicates an error condition, which can lead to software vulnerable to attack by hackers.

Figure 8:
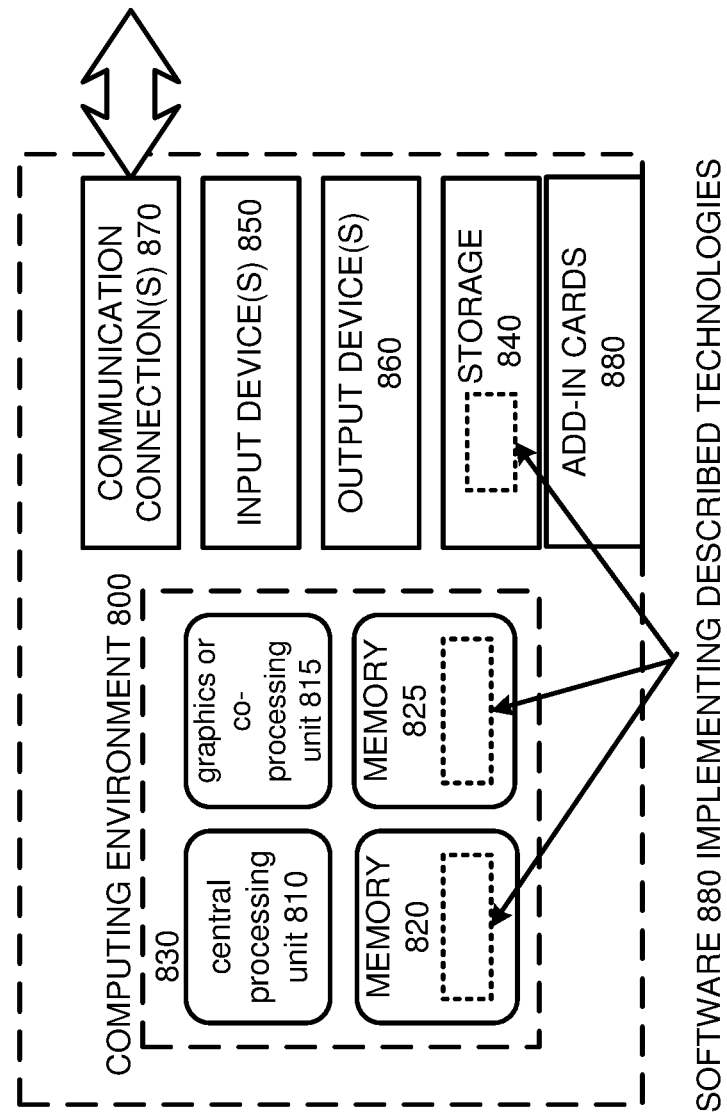
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870 (which can include a NIC). Add-in cards 880 can also be used to supplement functionality of the computing environment 800. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment

800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of generating error testing for an add-in card on a host server computer, the method comprising:
   from the host server computer, the host server computer operating as a Peripheral Component Interconnect Express (PCIe) root complex, detecting a configuration space of an add-in card coupled to a PCIe bus as a PCIe endpoint within the host server computer;
   loading error testing code into a memory of the add-in card, the add-in card including an embedded processor;
   generating errors on the PCIe bus using the error testing code; and
   monitoring how the host server computer responds to the generated errors.

2. The method of claim 1, wherein the loading of the error testing code is performed by transmitting the error testing code from the host server computer to the add-in card, the method further including triggering execution of the error testing code on the add-in card, wherein the triggering is generated from the host server computer and execution of the error testing code is performed by the embedded processor.

3. The method of claim 1, further including determining which error testing code to load into the memory of the add-in card based on the detected configuration from the host server computer.

4. The method of claim 1, further including generating a response by the add-in card for a configuration space including reading configuration parameters from the add-in card.

5. The method of claim 1, wherein the host server computer is a first host server computer and wherein the testing code is controlled by a second host server computer coupled to the first host server computer through a network.

6. The method of claim 1, wherein the add-in card is a Network Interface Card (NIC) that couples the host server computer to a network in normal operating mode.

7. A method of generating error testing, the method comprising:
loading testing code from a host server computer to an add-in card positioned within a slot on the host server computer and storing the testing code in memory on the add-in card;
receiving bus transactions on the host server computer associated with the testing code, the bus transactions including errors generated by the testing code; and
monitoring how the host server computer handles the errors generated by the testing code.

8. The method of claim 7, wherein the add-in card is a Network Interface Card (NIC).

9. The method of claim 7, further including triggering the add-in card to execute the testing code, wherein the add-in card includes an embedded processor that executes the testing code in response to the triggering.

10. The method of claim 7, wherein the testing code tests communications on an interface bus between the host server computer and the add-in card.

11. The method of claim 7, wherein the add-in card uses a Peripheral Component Interconnect Express (PCIe) interface.

12. The method of claim 7, further including reading, using the host server computer, configuration parameters associated with the add-in card and wherein the loading of the testing code includes selecting which testing code to load based on the configuration parameters.

13. The method of claim 7, wherein the add-in card includes a Base Address Register (BAR) and the loading of the testing code includes using the BAR to load the testing code into the memory of the add-in card.

14. The method of claim 7, wherein the loading of the testing code occurs in response to updates of an operating system or Basic Input/Output System (BIOS) of the host server computer.

15. The method of claim 7, wherein the host server computer is a first host server computer and wherein the monitoring of the first host server computer includes reading, from a second host server computer, log data stored on the first host server computer to determine how the first host server computer responded to the errors.

16. The method of claim 7, wherein the errors include receiver errors or Transaction layer Packet errors on a Peripheral Component Interconnect Express (PCIe) bus.

17. A system, comprising:
a host server computer including a motherboard, a communication bus, and a slot for receiving an add-in card;
an add-in card coupled into the slot, wherein the add-in card includes an embedded processor and a memory; and
error testing code supplied from the host server computer and stored in the memory of the add-in card for execution by the embedded processor, wherein the embedded processor is configured to execute the error testing code in response to a trigger event from the host server computer, and wherein the error testing code includes a test that injects an error onto the communication bus.

18. The system of claim 17, wherein the communication bus is a Peripheral Component Interconnect Express (PCIe) interface bus.

19. The system of claim 17, wherein the host server computer is a first host server computer and the error testing is controlled by a second host server computer coupled through a network connection to the first host server computer.

20. The system of claim 17, wherein the host server computer is configured to read configuration parameters of the add-in card and select error testing code associated with the configuration parameters.

\* \* \* \* \*